(12) United States Patent
Lemke

(10) Patent No.: US 7,067,736 B1
(45) Date of Patent: Jun. 27, 2006

(54) METHOD AND APPARATUS FOR ELECTRICAL BOX REPAIR COVER

(76) Inventor: Scott L. Lemke, 5816 Hickory Dr., Apt. H, Oak Park, CA (US) 91377

( * ) Notice: Subject to any disclaimer, the term of this patent is extended or adjusted under 35 U.S.C. 154(b) by 0 days.

(21) Appl. No.: 11/128,887

(22) Filed: May 13, 2005

(51) Int. Cl.
*H02G 3/08* (2006.01)

(52) U.S. Cl. .............................. 174/50; 174/53; 174/58; 220/3.2; 220/3.8

(58) Field of Classification Search ................ 174/48, 174/50, 53, 57, 58, 66, 67; 220/3.2, 3.3, 220/3.4, 3.5, 3.6, 3.7, 3.8, 4.02, 241, 242; 248/906; D13/152; 439/535, 536, 537, 439/538
See application file for complete search history.

(56) References Cited

U.S. PATENT DOCUMENTS

| | | | | |
|---|---|---|---|---|
| 4,652,023 A | * | 3/1987 | Timmons | 285/93 |
| 5,021,616 A | * | 6/1991 | Hardt | 174/67 |
| 5,239,129 A | * | 8/1993 | Ehrenfels | 174/50 |
| 5,531,345 A | * | 7/1996 | Nakamura et al. | 220/3.8 |
| 5,700,977 A | * | 12/1997 | Ford et al. | 174/64 |
| 6,653,566 B1 | * | 11/2003 | Petak et al. | 174/66 |
| 6,703,562 B1 | * | 3/2004 | Pacheco | 174/66 |
| 6,855,887 B1 | * | 2/2005 | Fox | 174/53 |
| D502,687 S | * | 3/2005 | Sherman | D13/156 |

\* cited by examiner

*Primary Examiner*—Angel R. Estrada
(74) *Attorney, Agent, or Firm*—Heimlich Law; Alan Heimlich, Esq.

(57) ABSTRACT

A method and apparatus for an electrical box repair cover have been described. Two substantially U-shaped members are capable of being positioned about an electrical box and then connected together resulting in being affixed to the electrical box. A cover may be secured to the electrical box by various techniques including straps, clamps, etc.

9 Claims, 6 Drawing Sheets

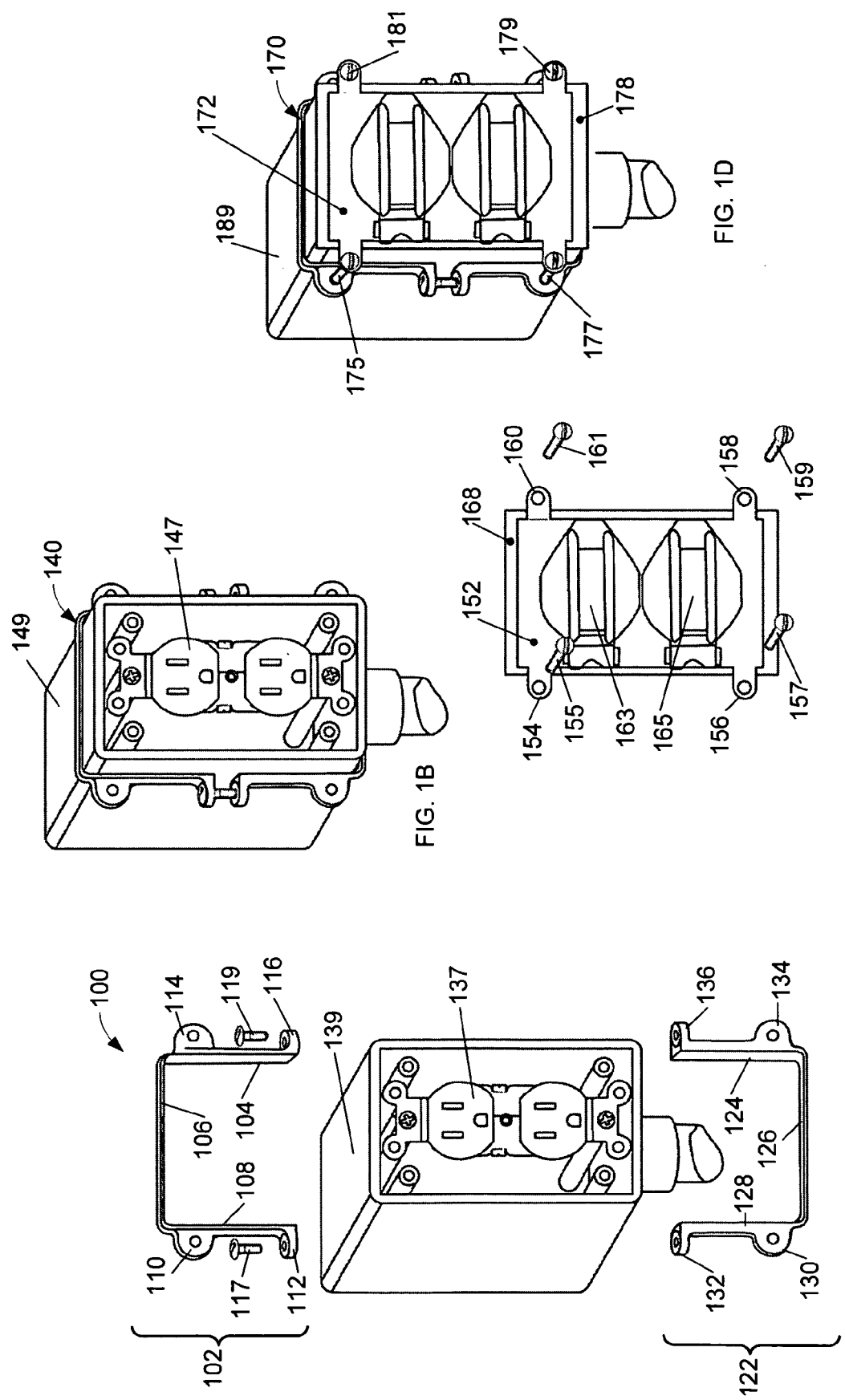

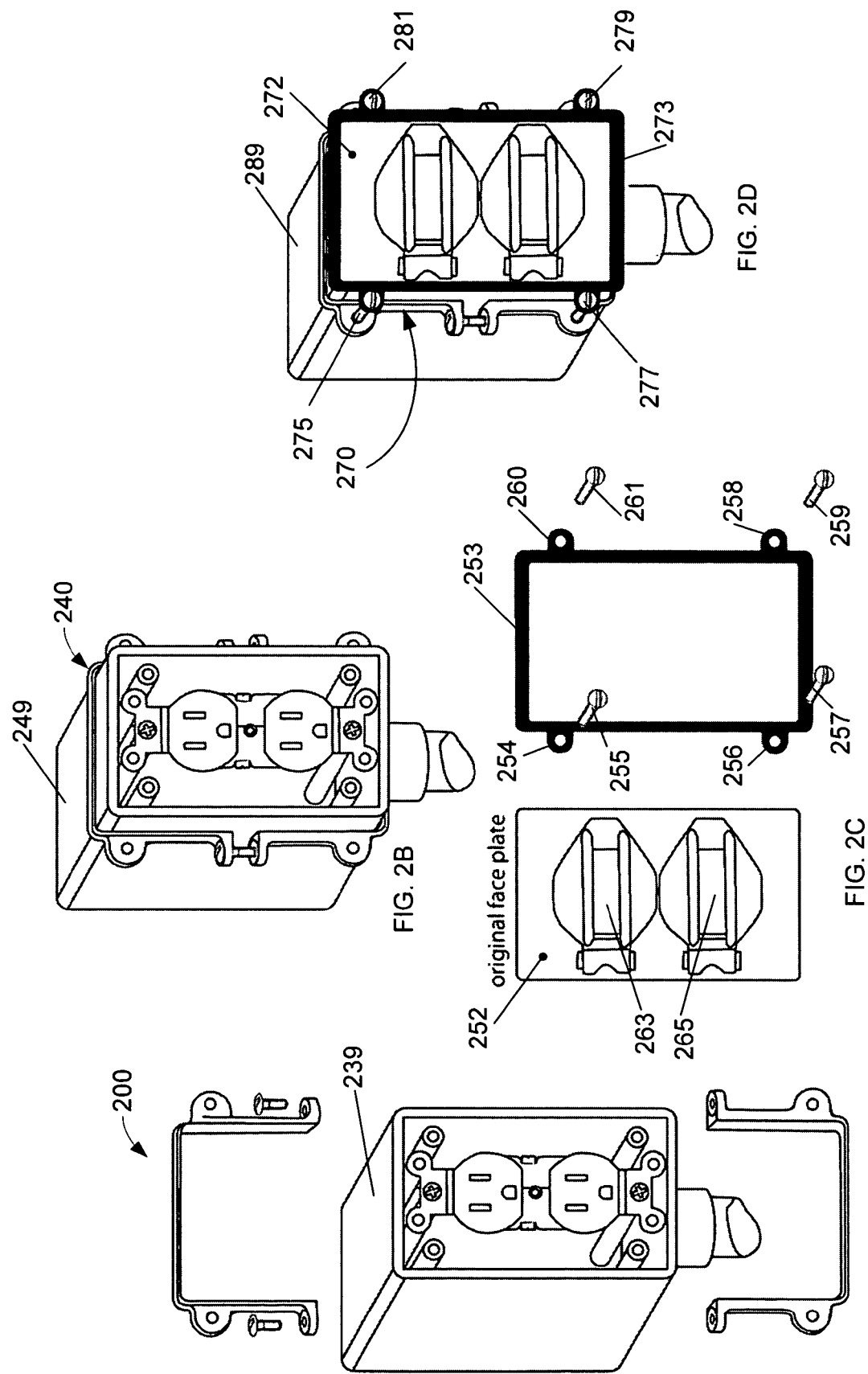

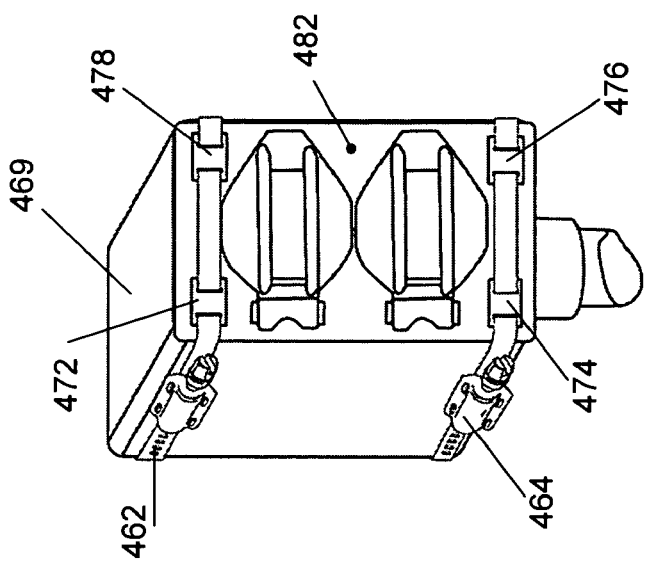
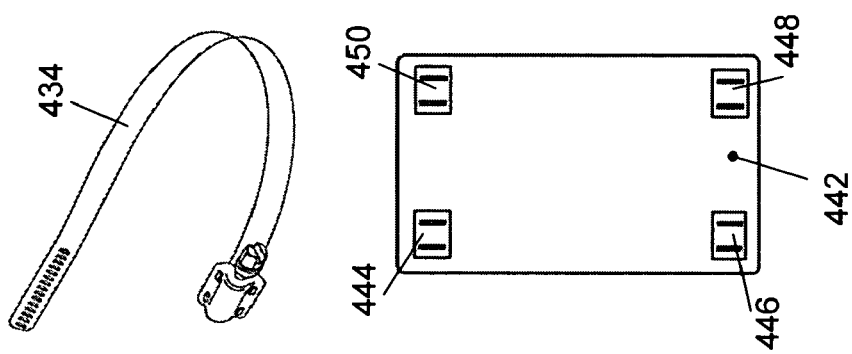
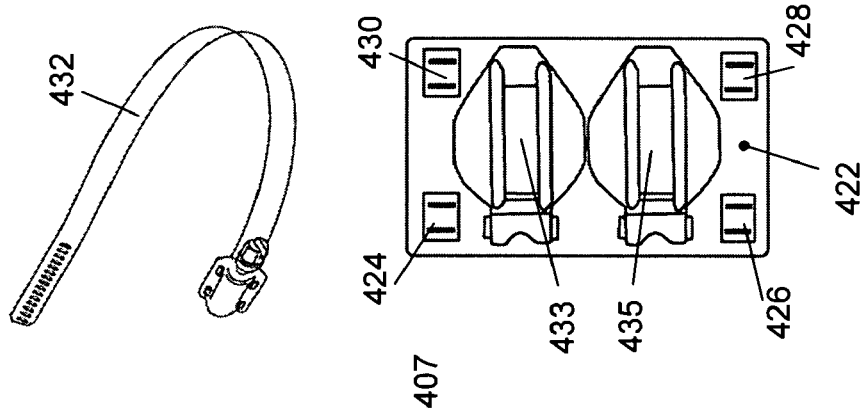
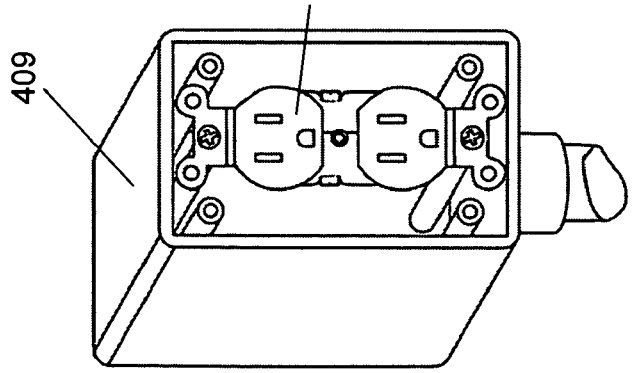

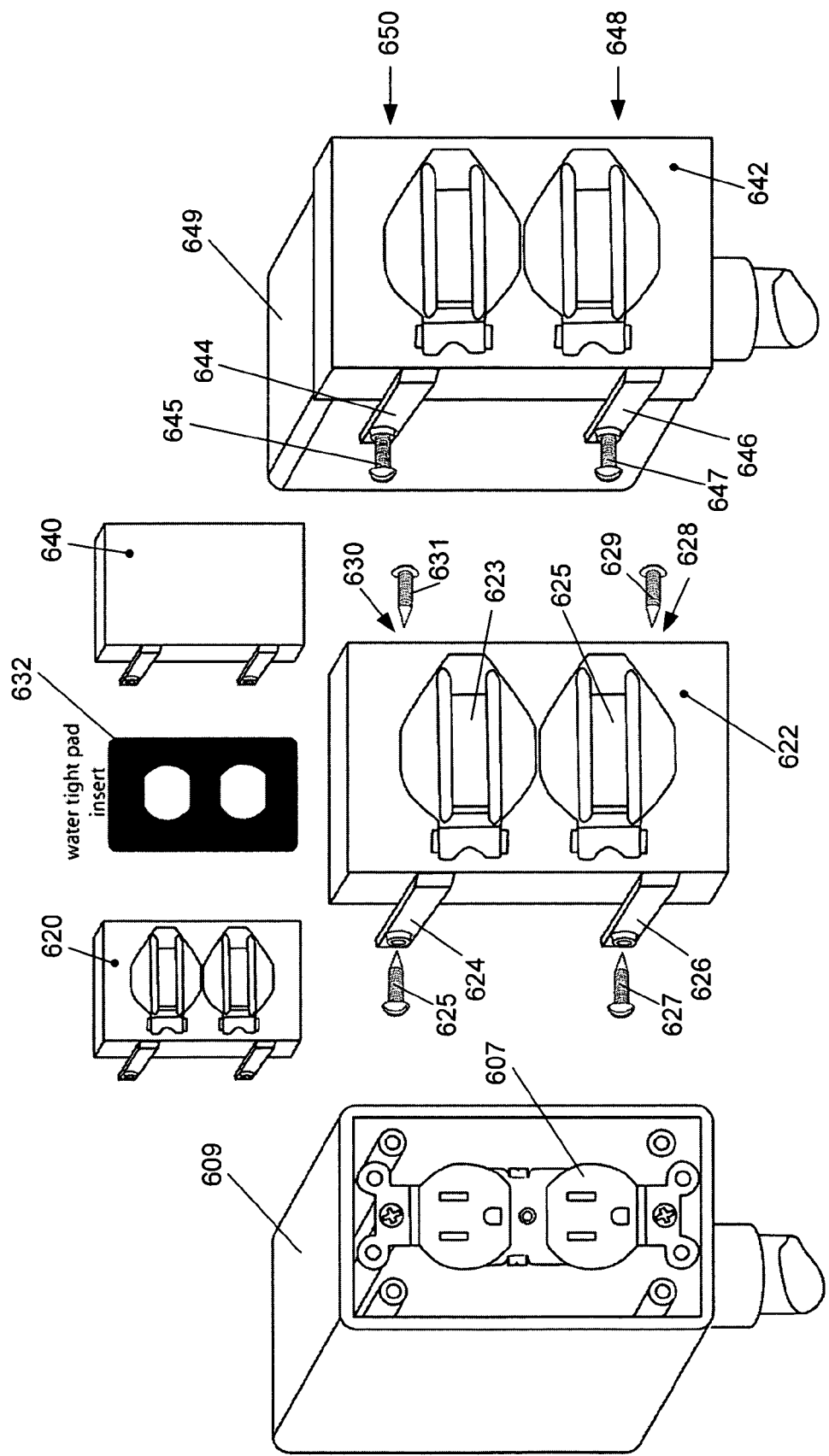

METHOD AND APPARATUS FOR ELECTRICAL BOX REPAIR COVER

FIELD OF THE INVENTION

The present invention pertains to electrical boxes also know as junction boxes. More particularly, the present invention relates to a method and apparatus for an electrical box repair cover.

BACKGROUND OF THE INVENTION

Electrical boxes, also known as junction boxes or boxes, are the predominant method for making and terminating electrical connections to other devices, such as, but not limited to switches, outlets, etc.

Often when connecting an electrical device to electrical wiring a cover of some type is used to protect the wiring and/or the device from environmental elements, such as, but not limited to rain, nesting insects, etc.

Sometimes the fastening means for securing the covers to the electrical boxes become inoperative. For example, screws used to fasten a cover to an electrical box may be over tightened resulting in stripped threads or stripping the "boss" into which the screw is treaded. Replacing an electrical box because of stripping is problem.

Weather and age may also corrode these boxes and covers over time. When screws become corroded and rusted, the heads may break off and as a result there is no way to reattach a cover to a box. If you have multiple conduits and electrical wire running through these boxes, it makes replacing the electrical boxes a very hard and time consuming job. These boxes may still be safe, however, there is no way to attach a cover to them and as a result the box may need to be replaced. This presents a problem.

BRIEF DESCRIPTION OF THE DRAWINGS

The invention is illustrated by way of example and not limitation in the figures of the accompanying drawings in which:

FIG. 1A, FIG. 1B, FIG. 1C, and FIG. 1D illustrates various embodiments of the invention;

FIG. 2A, FIG. 2B, FIG. 2C, and FIG. 2D illustate one embodiment of the invention also showing use of an unmodified face plate;

FIG. 4A, FIG. 4B, and FIG. 4C illustrate one embodiment of the invention also showing strap clamps around the electrical box and a cover;

FIG. 6A, FIG. 6B, and FIG. 6C illustrate one embodiment of the invention also showing a cover with securing legs.

DETAILED DESCRIPTION

Figures 3A, 3B, 3C:
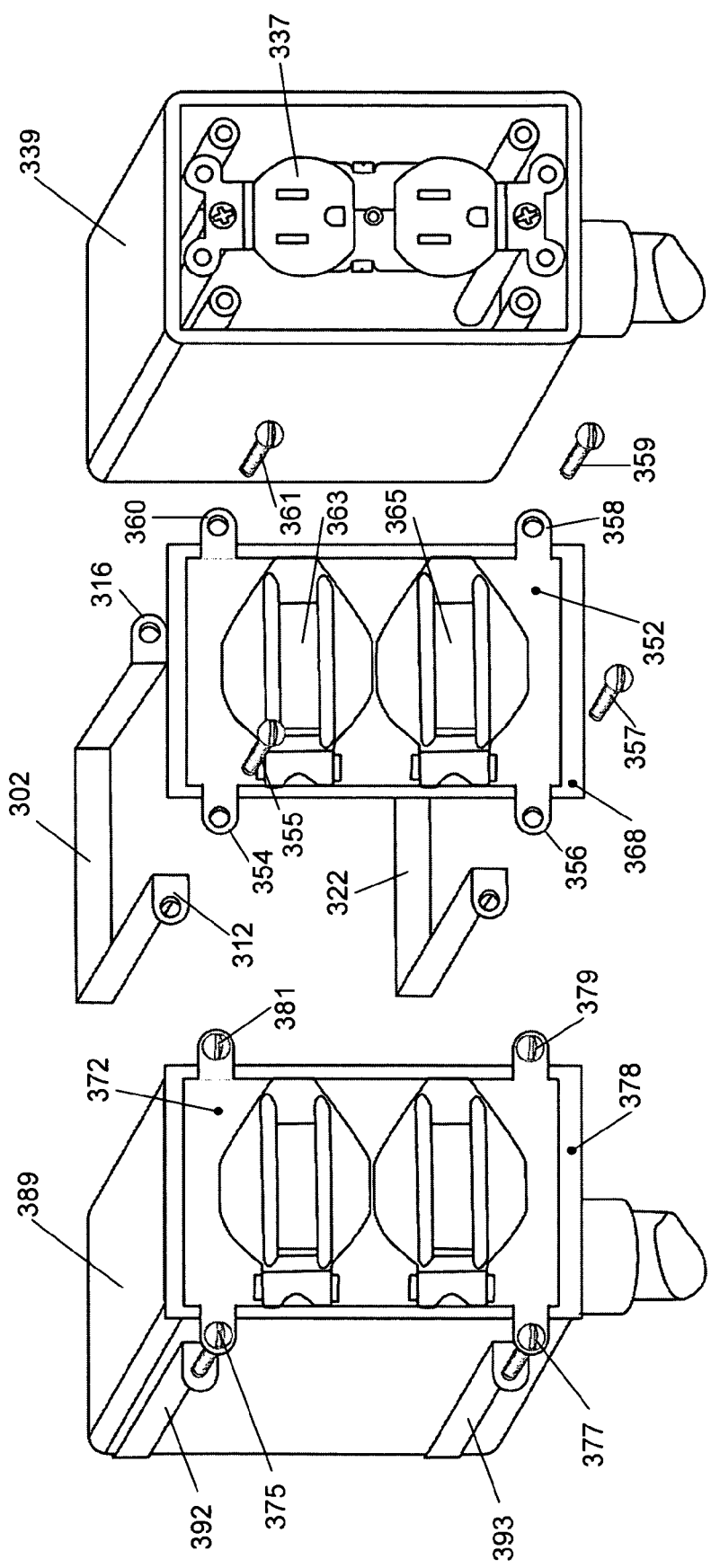
FIG. 3A, FIG. 3B, and FIG. 3C illustrate one embodiment of the invention also showing straps around the back of an electrical box.

The invention, as exemplified in various embodiments, illustrates a method and apparatus for attaching a cover to an electrical box.

In one embodiment of the invention, an external fastening electrical cover is attached to a damaged electrical box.

In another embodiment of the invention, when original (internal) screws used for securing a cover to an electrical box can no longer be used, external fastening screws and brackets will allow a cover to be safely attached preventing water penetration and/or electrical shock.

FIG. 1A illustrates a clamp mechanism 100 having two rectangular U-shaped sections 102 and 122. Section 102 has legs 104, 106, and 108 that form the U-shape. 102 also has tabs 112 and 116, as well as tabs or ears 110 and 114. Section 122 has legs 124, 126, and 128 that form the U-shape. 122 also has tabs 132 and 136, as well as tabs or ears 130 and 134. Electrical box 139 is shown housing an electrical outlet 137. Clamp 100 sections 102 and 122 may be placed on the outside of electrical box 139. Screw 117 and 119 may then secure sections 102 and 122 via pressure to the outside of the electrical box 139 by the threaded section of screw 117 passing through a hole in tab 112 and being threaded into the tapped hole in tab 132, and by the threaded section of screw 119 passing through a hole in tab 116 and being threaded into the tapped hole in tab 136.

FIG. 1B illustrates clamp 140 secured around electrical box 149 housing an electrical outlet 147.

FIG. 1C illustrates a face plate or cover assembly. Cover 152 has four tabs 154, 156, 158, and 160. In this embodiment, the tabs 154, 156, 158, and 160 have holes that allow the threaded portion of screws 155, 157, 159, and 161 to pass through the respective tabs. In this embodiment, cover 152 also has lids 163 and 165 that may be closed (as shown) to keep environmental elements from entering the electrical box (such as 149). To form a seal against environmental elements a gasket, seal, or pad 168 may be situated between the cover 152 and an electrical box (such as 149).

FIG. 1D illustrates clamp 170 secured to electrical box 189. A gasket 178 is situated between cover 172 and electrical box 189. Cover 172 is drawn tight against electrical box 189 by tightening screws 175, 177, 179, and 181.

FIG. 1A, FIG. 1B, FIG. 1C, and FIG. 1D illustrate how this embodiment of the invention cover and bracket design allows an exterior power box to be sealed safely in the event of screw or tap damage that prevents securing the cover. This arrangement gives an electrician a quick way to seal a damaged receptacle and continue without having to rewire the receptacle or junction box.

FIG. 2A shows clamp 200 having two U-shaped sections that may be fitted over the outside of an electrical box 239.

FIG. 2B shows claim 240 tightened around electrical box 249.

FIG. 2C illustrates a face plate or cover 252 with lids 263 and 265 that may have been originally used on an electrical box (such as 249) but which now no longer may be attached because of, for example, stripped screw inserts in the electrical box (such as 249). Frame 253 has four tabs or ears 254, 256, 258, and 260 as shown in this embodiment with holes allowing the threaded portions of screws 255, 257, 259, and 261 to pass thorough the respective tabs.

FIG. 2D illustrates clamp 270 secured to electrical box 289. Original faceplate or cover 272 is situated between frame cover 273 and electrical box 289. Cover 272 is drawn tight against electrical box 289 by tightening the frame 273 against the cover 272 via screws 275, 277, 279, and 281.

FIG. 2A, FIG. 2B, FIG. 2C, and FIG. 2D illustrate how this embodiment of the invention cover and bracket design allows an exterior power box to be sealed safely in the event of screw or tap damage. This arrangement gives an electrician a quick way to seal a damaged receptacle reusing the original face plate and continue without having to rewire the receptacle or junction box.

FIG. 3A shows an electrical box 339 housing an electrical outlet 337.

FIG. 3B shows two straps 302 and 322. Shown for strap 302 are tabs 312, and 316. Strap 322 has two tabs, only one of which is shown (not labeled). Cover 352 has four tabs 354, 356, 358, and 360. In this embodiment, the tabs 354, 356, 358, and 360 have holes that allow the threaded portion of screws 355, 357, 359, and 361 to pass through the respective tabs. In this embodiment, cover 352 also has lids 363 and 365 that may be closed (as shown) to keep environmental elements from entering the electrical box (such as 339). To form a seal against environmental elements a gasket, seal, or pad 368 may be situated between the cover 352 and an electrical box (such as 339).

FIG. 3C illustrates straps 392 and 393 secured around electrical box 389. A gasket 378 is situated between cover 372 and electrical box 389. Cover 372 is drawn tight against electrical box 389 by tightening screws 375, 377, 379, and 381.

FIG. 3A, FIG. 3B, and FIG. 3C illustrate how this embodiment of the invention cover and bracket design allows an exterior power box to be sealed safely in the event of screw or tap damage that prevents securing the cover. This arrangement gives an electrician a quick way to seal a damaged receptacle and continue without having to rewire the receptacle or junction box.

FIG. 4A shows an electrical box 409 housing into which an electrical outlet 407 is mounted.

FIG. 4B shows clamps and face plates. Shown are strap clamps 432 and 434. Face plate 422 has lids 433 and 435, and four strap clamp guides 424, 426, 428, and 430. Faceplate 442 has four strap clamp guides 444, 446, 448, and 450.

FIG. 4C shows electrical box 469 with strap clamps 462 and 464 engaged with faceplate 482 (via 472, 478, and 474, 476 for straps 462 and 464 respectively). Face plate 482 may be tightened against electrical box 469 by tightening the strap clamps 462 and 464.

FIG. 4A, FIG. 4B, and FIG. 4C illustrate how this embodiment of the invention cover and bracket design allows an exterior power box to be sealed safely in the event of screw or tap damage that prevents securing the cover. This arrangement gives an electrician a quick way to seal a damaged receptacle using a band fastener and specially made slotted face plate.

Figure 5C:
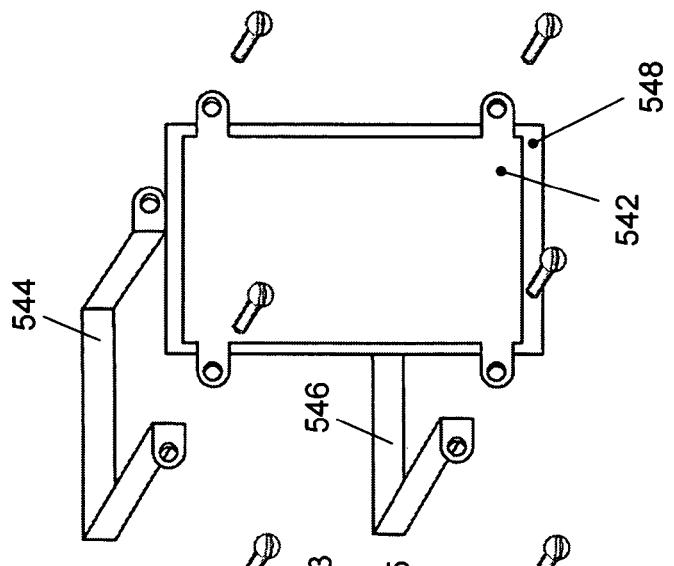
FIG. 5A, FIG. 5B, and FIG. 5C illustrate various embodiments of the invention also showing some various cover variations.
Figure 5B:
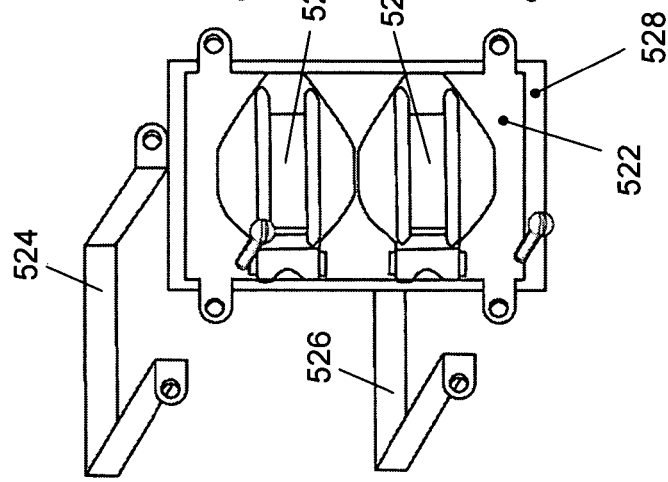
Figure 5A:
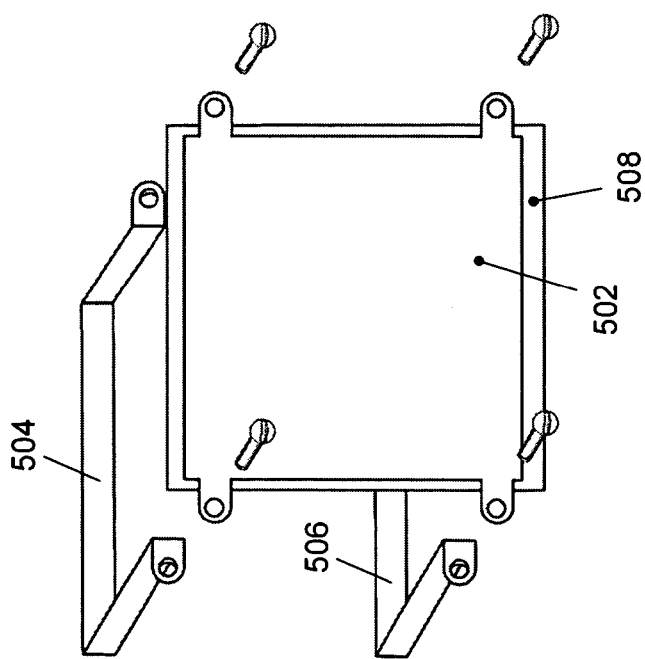

FIG. 5A illustrates one embodiment of the invention showing brackets 504 and 506, an optional seal 508, and a multiple gang faceplate 502.

FIG. 5B illustrates one embodiment of the invention showing brackets 524 and 526, an optional sealing gasket 528, and a cover faceplate 522 having two lids 523 and 525 which may cover, for example, electrical outlets.

FIG. 5C illustrates one embodiment of the invention showing brackets 544 and 546, an optional seal 548, and a single gang faceplate 542.

FIG. 6A shows an electrical box 609 into which an electrical outlet 607 is mounted.

FIG. 6B illustrates various embodiments of the invention. 620 illustrates a 2 lid cover faceplate having 4 legs (only 2 shown due to perspective view). 632 illustrates a water tight pad insert. In this illustration pad 632 has cutouts for a two receptacle outlet. Cover 640 has no openings for electrical devices and also has 4 legs (only 2 shown).

Cover 622 has two lids 623 and 625, and 4 legs 624, 626 as shown and two others located at positions shown by arrows 628 and 630 but not shown because of the perspective view. Legs 624, 626, and those at positions 628 and 630, accept screws 625, 627, 629, and 631 respectively.

FIG. 6C illustrates an electrical box 649 with a cover 642 secured to the box 649 by screws 645 (leg 644), 647 (leg 646), and two screws at locations indicated by arrows 648 and 650.

While the invention has been illustrated with respect to electrical or junction boxes, the invention is not so limited. The techniques of the invention may be used to secure a cover to a receptacle.

One of skill in the art will appreciate that the present invention has many variations only a small sample of which are illustrated in the Figures. For example, referring to FIG. 1, a variation on clamp 100 may be a rectangular clamp requiring only a single screw for closing, for example, in this variation, legs 104 and 124 may be one contiguous leg and screw 117 and tabs 112 and 132 may be the means of tightening variation on clamp 100 to an electrical box.

Other variations may include, but are not limited to, a rectangular frame that may be slid over an electrical box and secured with a cam-like screw mechanism. Another variation is a push-over frame with one-way gripping prongs which when a face plate is secured to it will "dig" into the electrical box. Other variations may include crisscrossing straps around the electrical box, raised bumps for gripping on the straps and/or clamps, straps that go over the top and/or bottom of an electrical box, etc.

While the Figures have illustrated a "free standing" electrical box, the invention is not so limited and my be used on other electrical boxes as well, for example, back mounted, side stud mounted, etc.

Thus a method and apparatus for an electrical box repair cover have been described.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of skill in the art that the present invention may be practiced without these specific details. In some instances, well-known structures and devices are shown in block diagram form, rather than in detail, in order to avoid obscuring the present invention. These embodiments are described in sufficient detail to enable those of skill in the art to practice the invention, and it is to be understood that other embodiments may be utilized and that logical, mechanical, electrical, and other changes may be made without departing from the scope of the present invention.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Thus a method and apparatus for an electrical box repair cover have been described.

What is claimed is:

1. An apparatus comprising:
   a first substantially rectangular U-shaped member having a first end and a second end, said first end having a first tab substantially parallel to the bottom of said first U-shaped member, and said second end having a second tab substantially parallel to the bottom of said first U-shaped member;

a second substantially rectangular U-shaped member having a first end and a second end, said first end having a first tab substantially parallel to the bottom of said second U-shaped member, and said second end having a second tab substantially parallel to the bottom of said second U-shaped member;

a first fastening device and a second fastening device wherein said first fastening device is capable of engaging said first U-shaped member first tab with said second U-shaped member first tab and wherein said second fastening device is capable of engaging said first U-shaped member second tab with said second U-shaped member second tab;

a third tab located proximate to a first corner of said first U-shaped member and substantially in a plane defined by first U-shaped member legs;

a fourth tab located distal to said first corner of said first U-shaped member and substantially in a plane defined by first U-shaped member legs;

a third tab located proximate to a first corner of said second U-shaped member and substantially in a plane defined by second U-shaped member legs; and a fourth tab located distal to said first corner of said second U-shaped member and substantially in a plane defined by second U-shaped member legs.

2. The apparatus of claim 1 wherein said first fastening device and said second fastening device are a screw.

3. The apparatus of claim 1 further comprising:

a first hole in said first tab of said first U-shaped member through which a threaded portion of a first screw may pass;

a second hole in said second tab of said first U-shaped member through which a threaded portion of a second screw may pass;

a first threaded hole in said first tab of said second U-shaped member into which said first screw threaded portion may thread; and a second threaded hole in said second tab of said second U-shaped member into which said second screw threaded portion may thread.

4. The apparatus of claim 3 wherein said first screw and said second screw are captively attached to said first U-shaped member.

5. The apparatus of claim 1 further comprising:

a first hole in said first tab of said first U-shaped member through which a threaded portion of a first screw may pass;

a second threaded hole in said second tab of said first U-shaped member into which a threaded portion of a second screw may thread;

a first threaded hole in said first tab of said second U-shaped member into which said threaded portion of said first screw may thread; and a second hole in second tab of said second U-shaped member through which said second screw threaded portion may pass.

6. The apparatus of claim 5 wherein said first screw is captively attached to said first U-shaped member.

7. The apparatus of claim 1 wherein said first fastening device and said second fastening device are a self-tapping screw.

8. The apparatus of claim 1 wherein said first fastening device and said second fastening device are a spring clamp device.

9. The apparatus of claim 1 wherein said first fastening device and said second fastening device are a rivet.

* * * * *